United States Patent
Kluttz et al.

(10) Patent No.: US 9,329,766 B2
(45) Date of Patent: May 3, 2016

(54) HOMEPAGE RE-ASSIGNMENT

(75) Inventors: Karen R. Kluttz, Raleigh, NC (US);
James A. Hunt, Chapel Hill, NC (US);
David Rivera, Durham, NC (US); Rod D. Waltermann, Rougemount, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 13/151,884

(22) Filed: Jun. 2, 2011

(65) Prior Publication Data

US 2012/0311466 A1    Dec. 6, 2012

(51) Int. Cl.
*G06F 3/01* (2006.01)
*G06F 3/0488* (2013.01)
*G06F 9/44* (2006.01)
*G06F 3/0485* (2013.01)

(52) U.S. Cl.
CPC ............ *G06F 3/0488* (2013.01); *G06F 3/0485* (2013.01); *G06F 9/4443* (2013.01)

(58) Field of Classification Search
CPC ... G06F 3/0488; G06F 3/0485; G06F 9/4443; G06F 3/0481; G09G 5/14
USPC .................. 715/760, 764, 778, 779
See application file for complete search history.

(56) References Cited

U.S. PATENT DOCUMENTS

| | | | | |
|---|---|---|---|---|
| 5,072,412 A * | 12/1991 | Henderson et al. | ........... | 715/804 |
| 6,664,983 B2 * | 12/2003 | Ludolph | ........... | 715/775 |
| 6,710,771 B1 * | 3/2004 | Yamaguchi et al. | ........... | 345/184 |
| 7,134,094 B2 * | 11/2006 | Stabb et al. | ........... | 715/827 |
| 7,370,279 B2 * | 5/2008 | Sugimoto | ........... | 715/760 |
| 8,208,964 B2 * | 6/2012 | Dobroth et al. | ........... | 455/566 |
| 8,266,550 B1 * | 9/2012 | Cleron et al. | ........... | 715/863 |
| 8,321,537 B1 * | 11/2012 | Rohrs et al. | ........... | 709/220 |
| 8,413,054 B2 * | 4/2013 | Kaplan et al. | ........... | 715/719 |
| 2002/0063736 A1 * | 5/2002 | Sugimoto | ........... | 345/762 |
| 2003/0045331 A1 * | 3/2003 | Montebovi | ........... | 455/566 |
| 2004/0230913 A1 * | 11/2004 | Moribe | ........... | 715/778 |
| 2005/0195217 A1 * | 9/2005 | Robertson et al. | ........... | 345/619 |
| 2006/0161889 A1 * | 7/2006 | Stabb et al. | ........... | 717/113 |
| 2007/0136681 A1 * | 6/2007 | Miller | ........... | 715/782 |
| 2007/0156483 A1 * | 7/2007 | Peters | ........... | 705/8 |
| 2008/0098058 A1 * | 4/2008 | Shih et al. | ........... | 709/201 |
| 2008/0244444 A1 * | 10/2008 | Bauman et al. | ........... | 715/806 |
| 2009/0100368 A1 * | 4/2009 | Look et al. | ........... | 715/775 |
| 2009/0204915 A1 * | 8/2009 | Yamagami et al. | ........... | 715/764 |
| 2009/0313559 A1 * | 12/2009 | Kane | ........... | 715/760 |
| 2010/0011315 A1 * | 1/2010 | Araki | ........... | 715/783 |
| 2010/0333029 A1 * | 12/2010 | Smith et al. | ........... | 715/834 |
| 2010/0333030 A1 * | 12/2010 | Johns | ........... | 715/834 |
| 2011/0078624 A1 * | 3/2011 | Missig et al. | ........... | 715/802 |
| 2011/0105187 A1 * | 5/2011 | Dobroth et al. | ........... | 455/566 |
| 2011/0202838 A1 * | 8/2011 | Han et al. | ........... | 715/702 |
| 2011/0252346 A1 * | 10/2011 | Chaudhri | ........... | 715/765 |

(Continued)

*Primary Examiner* — Anil Bhargava

(74) *Attorney, Agent, or Firm* — Ference & Associates LLC

(57) ABSTRACT

Systems, methods and products are described that provide homepage re-assignment. One aspect includes displaying a default homepage desktop view from among a plurality of scrollable desktop views; receiving user input via a user input device; opening a homepage re-assignment utility responsive to receiving said user input, said homepage re-assignment utility including a display indicating one or more desktop views selectable as a new homepage; and responsive to receiving a user input indicating a selection of a desktop view as a new homepage, changing a default homepage setting to a desktop view selected as a new homepage. Other embodiments are described.

16 Claims, 6 Drawing Sheets

(56) References Cited

U.S. PATENT DOCUMENTS

| | | | |
|---|---|---|---|
| 2011/0252380 A1* | 10/2011 | Chaudhri | 715/836 |
| 2011/0291945 A1* | 12/2011 | Ewing et al. | 345/173 |
| 2012/0019721 A1* | 1/2012 | Choi et al. | 348/564 |
| 2012/0084714 A1* | 4/2012 | Sirpal et al. | 715/790 |
| 2012/0095878 A1* | 4/2012 | Feldman et al. | 705/27.1 |
| 2012/0096396 A1* | 4/2012 | Ording et al. | 715/799 |
| 2012/0198547 A1* | 8/2012 | Fredette et al. | 726/19 |
| 2012/0204131 A1* | 8/2012 | Hoang et al. | 715/835 |
| 2012/0216146 A1* | 8/2012 | Korkonen | 715/835 |
| 2012/0246596 A1* | 9/2012 | Ording et al. | 715/799 |
| 2012/0254198 A1* | 10/2012 | Shih et al. | 707/751 |
| 2012/0311485 A1* | 12/2012 | Caliendo et al. | 715/784 |
| 2013/0076663 A1* | 3/2013 | Sirpal et al. | 345/173 |
| 2013/0080968 A1* | 3/2013 | Hanson et al. | 715/783 |
| 2013/0151981 A1* | 6/2013 | Green | 715/744 |

\* cited by examiner

HOMEPAGE RE-ASSIGNMENT

BACKGROUND

Various software applications ("apps") for use with information handling devices, such as tablet/slate computing devices, smart phones, and the like, are available. Software for mobile electronic devices often includes for example operating system(s), middleware and/or applications for operating the devices. For example, ANDROID operating system is software for mobile devices provided by Google Inc. Many software developers create and make available applications that extend the functionality of the devices when implemented along with ANDROID operating system. Much the same occurs with other operating systems for use with other devices, such as those developed by Apple Inc. ANDROID is a registered trademark of Google, Inc. in the United States and other countries.

Applications may be downloaded to and installed on the devices for increasing and customizing their functionality. Applications are quite popular and provide a wide range of functionality to the devices. Users often download and install many (tens to hundreds) of applications to their mobile devices in order to personalize the mobile devices for use. Conventionally, device displays are arranged in desktops (or desktop views), which are screen views displayed on a display device. These desktops provide an organization of downloaded and installed applications resident on the device, and users may page through the desktops with an appropriate input (for example, swiping a finger in the case of a touchscreen display). Conventionally, one desktop is assigned as a homepage. For example, in devices operating with ANDROID operating systems, the homepage is usually the center desktop view; whereas the homepage for devices running Apple operating systems is typically the leftmost desktop view.

BRIEF SUMMARY

In summary, one aspect provides a method comprising: displaying a default homepage desktop view from among a plurality of scrollable desktop views; receiving user input via a user input device; opening a homepage re-assignment utility responsive to receiving said user input, said homepage re-assignment utility including a display indicating one or more desktop views selectable as a new homepage; and responsive to receiving a user input indicating a selection of a desktop view as a new homepage, changing a default homepage setting to a desktop view selected as a new homepage.

Another aspect provides a system comprising: one or more processors; and a display device; wherein, responsive to execution of computer program instructions accessible to the one or more processors, the one or more processors are configured to: display a default homepage desktop view from among a plurality of scrollable desktop views; receive user input; open a homepage re-assignment utility responsive to receiving said user input, said homepage re-assignment utility including a display indicating one or more desktop views selectable as a new homepage; and responsive to receiving a user input indicating a selection of a desktop view as a new homepage, change a default homepage setting to a desktop view selected as a new homepage.

A further aspect provides a computer program product comprising: a computer readable storage medium having computer readable program code embodied therewith, the computer readable program code comprising: computer readable program code configured to display a default homepage desktop view from among a plurality of scrollable desktop views; computer readable program code configured to receive user input; computer readable program code configured to open a homepage re-assignment utility responsive to receiving said user input, said homepage re-assignment utility including a display indicating one or more desktop views selectable as a new homepage; and computer readable program code configured to, responsive to receiving a user input indicating a selection of a desktop view as a new homepage, change a default homepage setting to a desktop view selected as a new homepage.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

With the growing popularity of applications, users often download many such applications to a device. For example, it is not uncommon for a user to have downloaded dozens of applications to his or her mobile device, such as a smart phone, tablet, et cetera. Given this, users are confronted with an organization problem with respect to the applications resident on the device. Users often pick the homepage to be the desktop view having the most frequently used applications. However, users may find that more than one grouping of applications would be appropriate for use with the homepage, yet the homepage can only contain a certain number of applications.

Accordingly, an embodiment provides a convenient and easy mechanism by which a user may reassign the homepage for his or her device. Thus, a user may assign a certain desktop view as a homepage initially, and later re-assign the homepage to be a different desktop view. For example, a user having work related applications on a default homepage, and social media related applications resident on another desktop view, may re-assign the homepage to that desktop view having the social media applications. An embodiment allows for multiple users to operate the device, each having a homepage assigned.

The illustrated example embodiments will be best understood by reference to the figures. The following description is intended only by way of example, and simply illustrates certain example embodiments.

Figure 1:
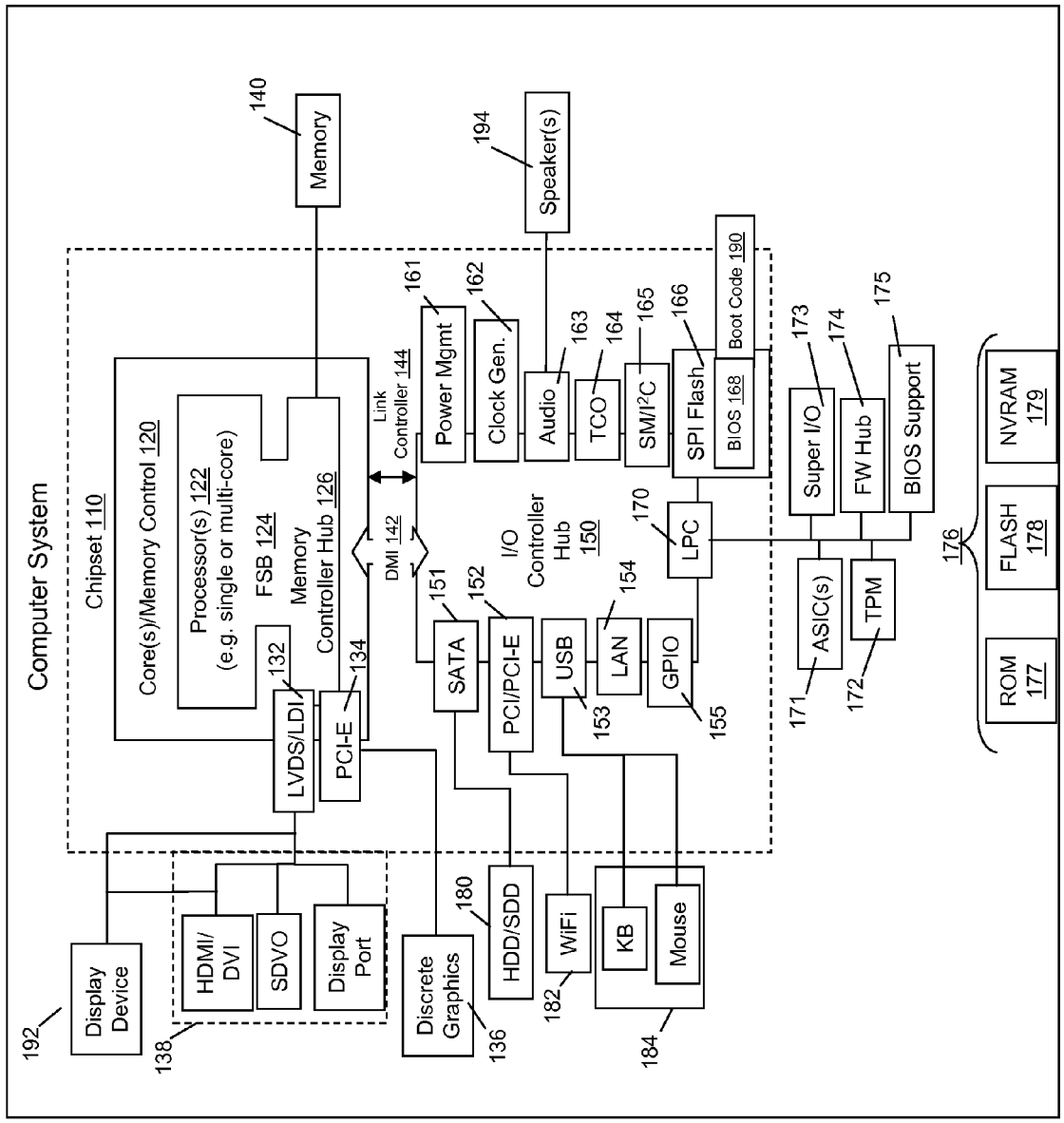
FIG. 1 illustrates an example circuitry of a computer system.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C., or other devices such as smart phones, tablet devices, and the like, as noted below. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, etcetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to smart phone and/or tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one design, a single chip is used to supply BIOS like functionality and DRAM memory.

Figure 2B:
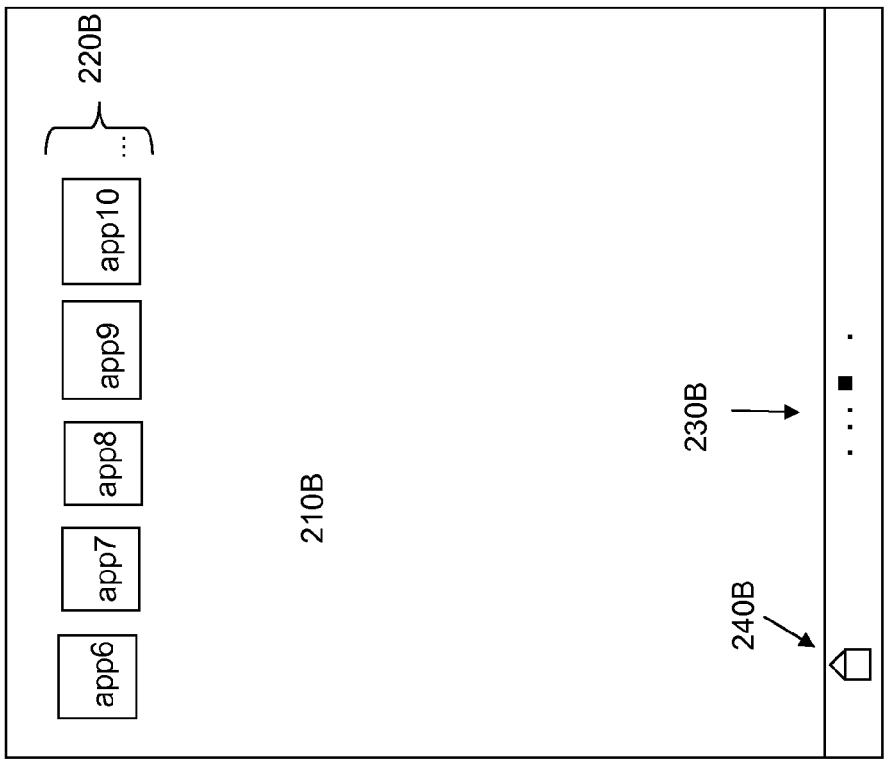
FIG. 2(A-B) illustrates example desktop views.
Figure 2A:
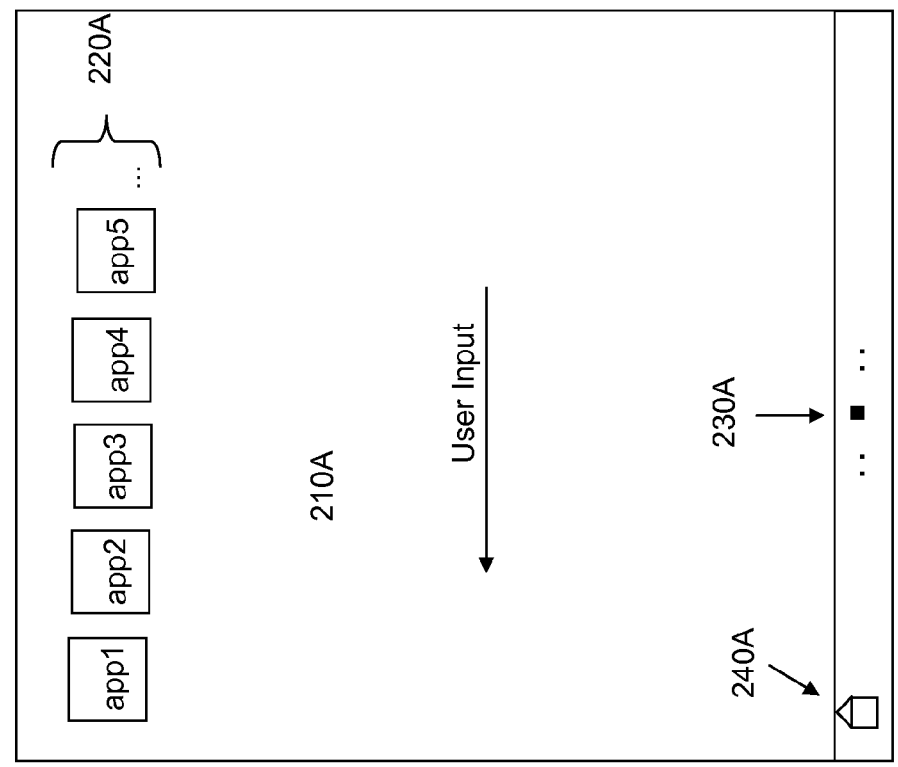

Referring to FIG. 2(A-B), an example of desktop views is illustrated. In FIG. 2A, a desktop view 210A (such as on a touchscreen display of a mobile device) is illustrated. The desktop view 210A contains application icons (apps1-5) which the user may select to open. An example application may be a web browser. A view indicator 230A indicates that this is the center desktop view of five possible desktop views. This desktop view 210A is the homepage, whereby if the user first starts the device, 210A is the desktop view that is displayed by default. Moreover, if the user navigates away from the desktop view 210A, as by a finger slide in the direction indicated by the user input arrow of FIG. 2A, and then selects the "home" icon 240A, the desktop view 210A will be returned (the user is returned to the home view/homepage).

Similarly, the view illustrated in FIG. 2B is that of another, non-homepage desktop view 210B. Here, other application icons (apps5-10) appear, and the view indicator 230B indicates that the user has navigated to a right desktop view from the homepage (which is the center desktop view, 210A), as for example via user input indicated by the arrow in FIG. 2A. If the user selects the "home" button 240B, the user will be returned from desktop view 210B to desktop view 210A (return to the homepage).

Referring to FIG. 3(A-C), an example interface for re-assigning the homepage is illustrated. In this example a user navigates to a view on the device that, for example, includes a variety of tabs and a small view of the desktop views (301A-305A). Such a view may be accessed in a variety of ways. For example, ANDROID honeycomb operating system currently includes a view that includes the tabs "Widgets", "App Shortcuts", "Wallpapers", and "More", also illustrated in the top of the view of FIG. 3(A-B) (however, these tabs would appear in the bottom of the view in ANDROID honeycomb operating system view, with the desktops views appearing on an upper portion of the view). A user obtains this view via selecting a "plus" symbol from a desktop view or long press (press and hold) in the desktop view.

Figure 3A:
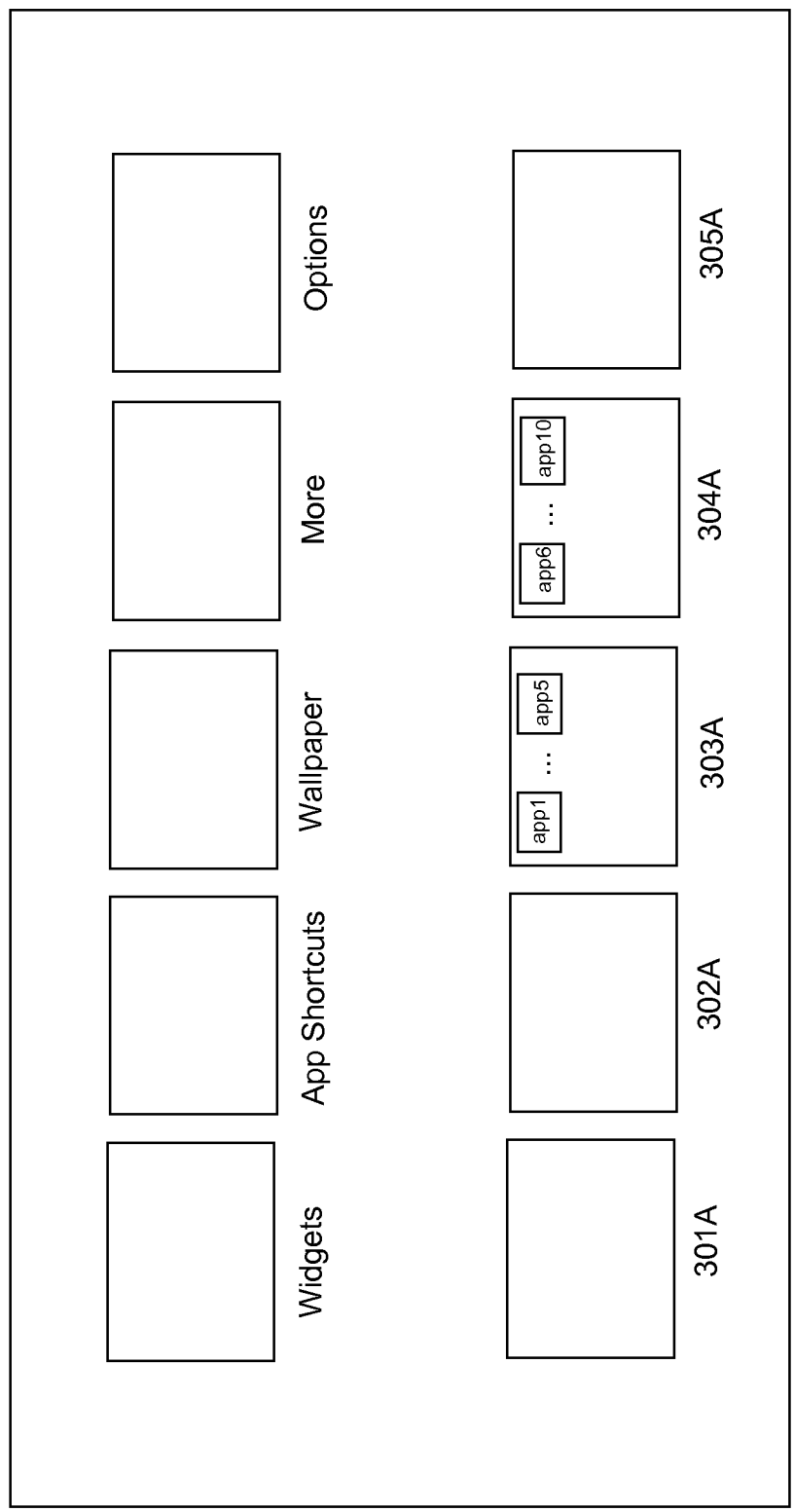
FIG. 3(A-C) illustrates examples of a homepage re-assignment utility.
Figure 3B:
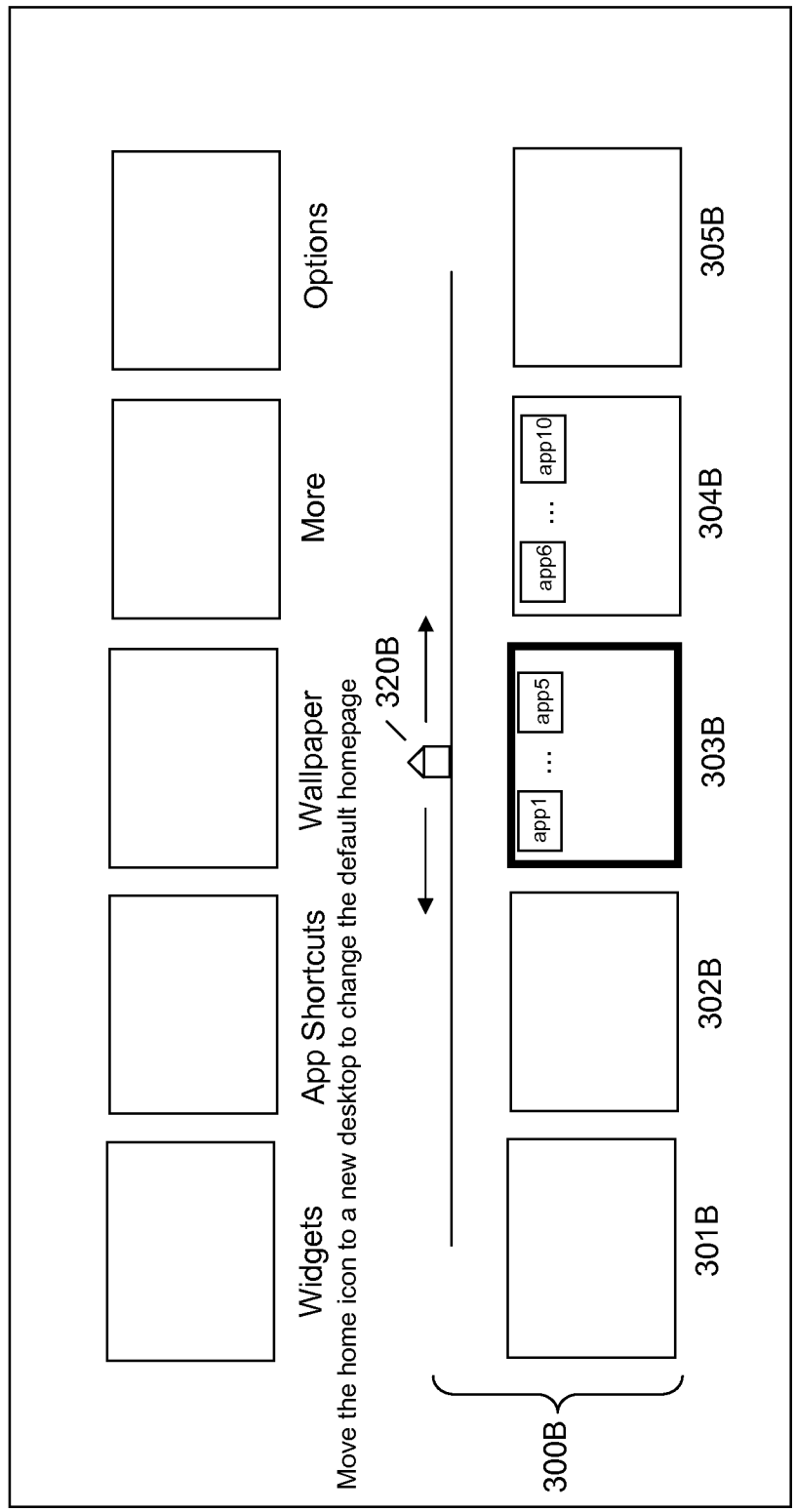

An embodiment may implement a new "Options" tab (FIG. 3A). Responsive to selection of the "Options" tab, an embodiment presents the homepage re-assignment utility 300B (FIG. 3B). The homepage re-assignment utility 300B may include a "home" icon 320B that the user may position above the desktop view (301B-305B) that the user desires to designate as the homepage. The homepage utility 300B may also include instructions for re-assigning the homepage, corresponding appropriately to the type of homepage re-assignment utility implemented.

Figure 3C:
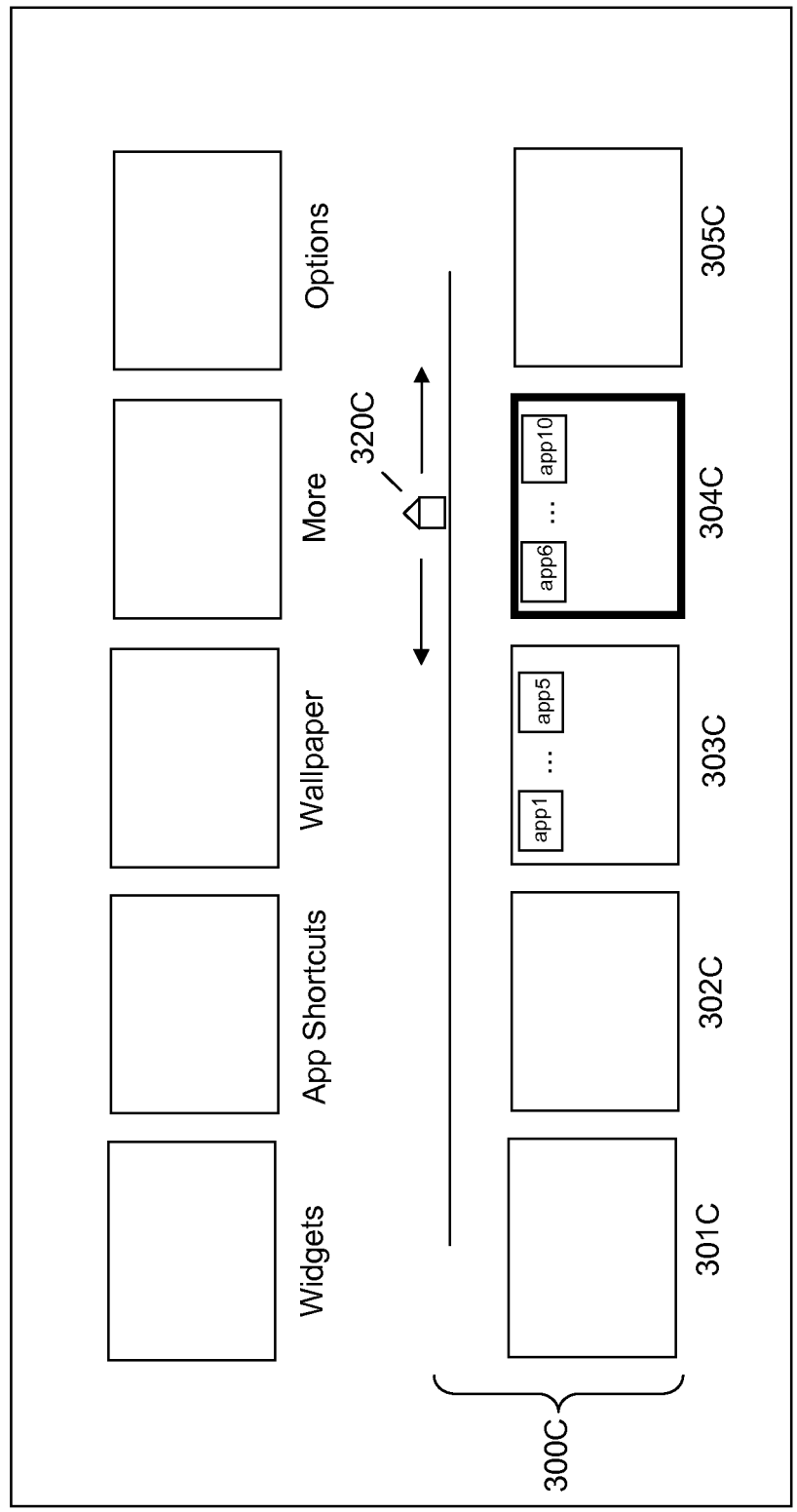

As an example, the user may position the home icon 320B via movement as a slider mechanism (for example, if implemented in a touchscreen interface). Currently, in the example illustrated in FIG. 3B, the center desktop 303B is selected as the homepage. The user may select a new desktop view (301B, 302B, 304B, or 305B) for assignment as the homepage, and responsive to repositioning the homepage icon 320, the new homepage will be selected. The selection of the new homepage may be highlighted, as for example providing a lighted border to the selected desktop view for a predetermined time (for example, 1000 ms) as shown in FIG. 3C, in which desktop view 302C (of possible selections 301C-305C) has been selected as the new homepage.

Figure 4:
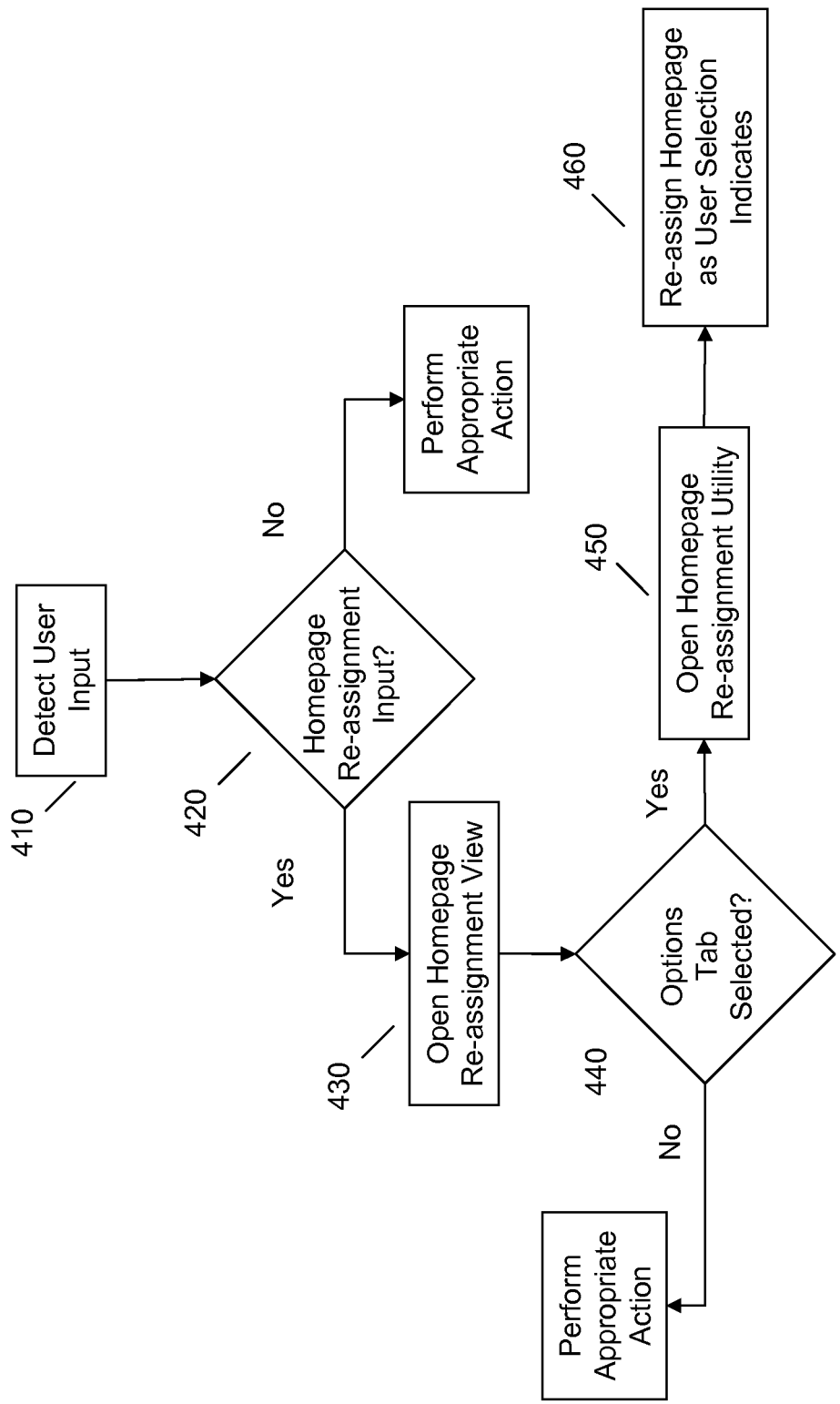
FIG. 4 illustrates an example method for re-assigning a homepage to a new desktop view.

Referring to FIG. 4, an example method for homepage re-assignment is illustrated. Responsive to detecting user input 410 and determining that the user input corresponds to homepage re-assignment input 420 (for example, a user long pressing within a desktop view), an embodiment opens a homepage re-assignment view (examples of which are illustrated in FIG. 3(A-C)). In the homepage re-assignment view, the user may select the options tab. Responsive to determining that the options tab has been selected 430, a homepage re-assignment utility is made available to the user (such as the example homepage re-assignment utility illustrated in FIG. 3(B-C). The user may then select the desired desktop view to set as the homepage and an embodiment makes this desktop view the default homepage 440, such that the user is returned to this desktop view when the homepage icon is selected and when the device is first started.

Embodiments may be implemented in one or more computing devices configured appropriately to execute program instructions consistent with the functionality of the embodiments as described herein. In this regard, FIG. 1 describes a non-limiting example of such a computing device. While mobile computing systems such as tablet computers and smart phones have been specifically mentioned as examples herein, embodiments may be implemented using other computing systems, such as desktops, laptops, workstations, servers and the like.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, apparatuses and computer program products according to various example embodiments. It will be understood that the actions and functionality illustrated may be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
accepting, at a mobile electronic device, user input to a home icon in response to a current desktop view being displayed on a display device of the mobile electronic device, wherein a desktop view includes executable application icons;
after the user input to the home icon is detected, scrolling from the current desktop view to a default homepage desktop view, wherein a plurality of desktop views are arranged in a scrolling order;
opening a homepage re-assignment utility that includes a slider for selecting a new desktop view as a new homepage, said homepage re-assignment utility including a display indicating desktop views selectable as a new homepage;
responsive to a selection of a desktop view as a new homepage, changing to a new homepage, said changing including changing the scrolling order; and
thereafter accepting user input to the home icon and scrolling from a currently displayed desktop view to the new homepage according to the new scrolling order.

2. The method according to claim 1, wherein a homepage is a desktop view displayed:
by default at start up;
in a default position among the plurality of scrollable desktop views; and
returned to upon selection of the home icon.

3. The method according to claim 1, wherein said selection of a desktop view as a new homepage includes movement of said slider to highlight said new desktop view.

4. The method according to claim 1, wherein said homepage re-assignment utility includes miniaturized views of desktop views available.

5. The method according to claim 1, wherein said display device comprises a touchscreen display.

6. The method according to claim 5, wherein said display device is implemented on one of: a tablet computing device, a slate computing device, and a smart phone.

7. The method according to claim 1, wherein said selection of a desktop view as a new homepage includes direct selection of a desktop view.

8. A system comprising:
one or more processors; and
a display device;
wherein, responsive to execution of computer program instructions accessible to the one or more processors, the one or more processors:
accept user input to a home icon in response to a current desktop view being displayed on the display device, wherein a desktop view includes executable application icons;
after the user input to the home icon is detected, scroll from the current desktop view to a default homepage desktop view, wherein a plurality of desktop views are arranged in a scrolling order;
open a homepage re-assignment utility that includes a slider for selecting a new desktop view as a new homepage, said homepage re-assignment utility including a display indicating one or more desktop views selectable as a new homepage;
responsive to a selection of a desktop view as a new homepage, change to a new homepage, the change including changing the scrolling order; and
thereafter accept user input to the homepage icon and scroll from a currently displayed desktop view to the new homepage according to the new scrolling order.

9. The system according to claim 8, wherein a homepage is a desktop view displayed:
by default at start up;
in a default position among the plurality of scrollable desktop views; and
returned to upon selection of the home icon.

10. The system according to claim 8, wherein said selection of a desktop view as a new homepage includes movement of said slider to highlight said new desktop view.

11. The system according to claim 8, wherein said homepage re-assignment utility includes miniaturized views of desktop views available.

12. The system according to claim 8, wherein said user display device comprises a touchscreen display.

13. The system according to claim 12, wherein said system is one of: a table computing device, a slate computing device, and a smart phone.

14. The system according to claim 8, wherein said selection of a desktop view as a new homepage includes direct selection of a desktop view.

15. The system according to claim 8, wherein said homepage re-assignment utility includes one or more instructions for selecting a new homepage.

16. A computer program product comprising:
a non transitory computer readable storage medium having computer readable program code embodied therewith and executable by the one or more processors, the computer readable program code comprising:
computer readable program code that accepts user input to a home icon in response to a current desktop view being displayed on a display device of a mobile electronic device, wherein a desktop view includes executable application icons;
computer readable program code that, after the user input to the home icon is detected, scrolls from the current desktop view to a default homepage desktop view, wherein a plurality of desktop views are arranged in a scrolling order;
computer readable program code that opens a homepage re-assignment utility that includes a slider for selecting a new desktop view as a new homepage, said homepage re-assignment utility including a display indicating one or more desktop views selectable as a new homepage;
computer readable program code that, responsive to receiving a selection of a desktop view as a new homepage, changes to a new homepage, the change including changing the scrolling order; and
computer readable program code that thereafter accepts user input to the home icon and scrolls from a currently displayed desktop view to the new homepage according to the new scrolling order.

* * * * *